Oct. 31, 1950 — T. B. CHACE — 2,528,423
FLUID MIXING CONTROL SYSTEM
Filed Nov. 13, 1945 — 3 Sheets-Sheet 1
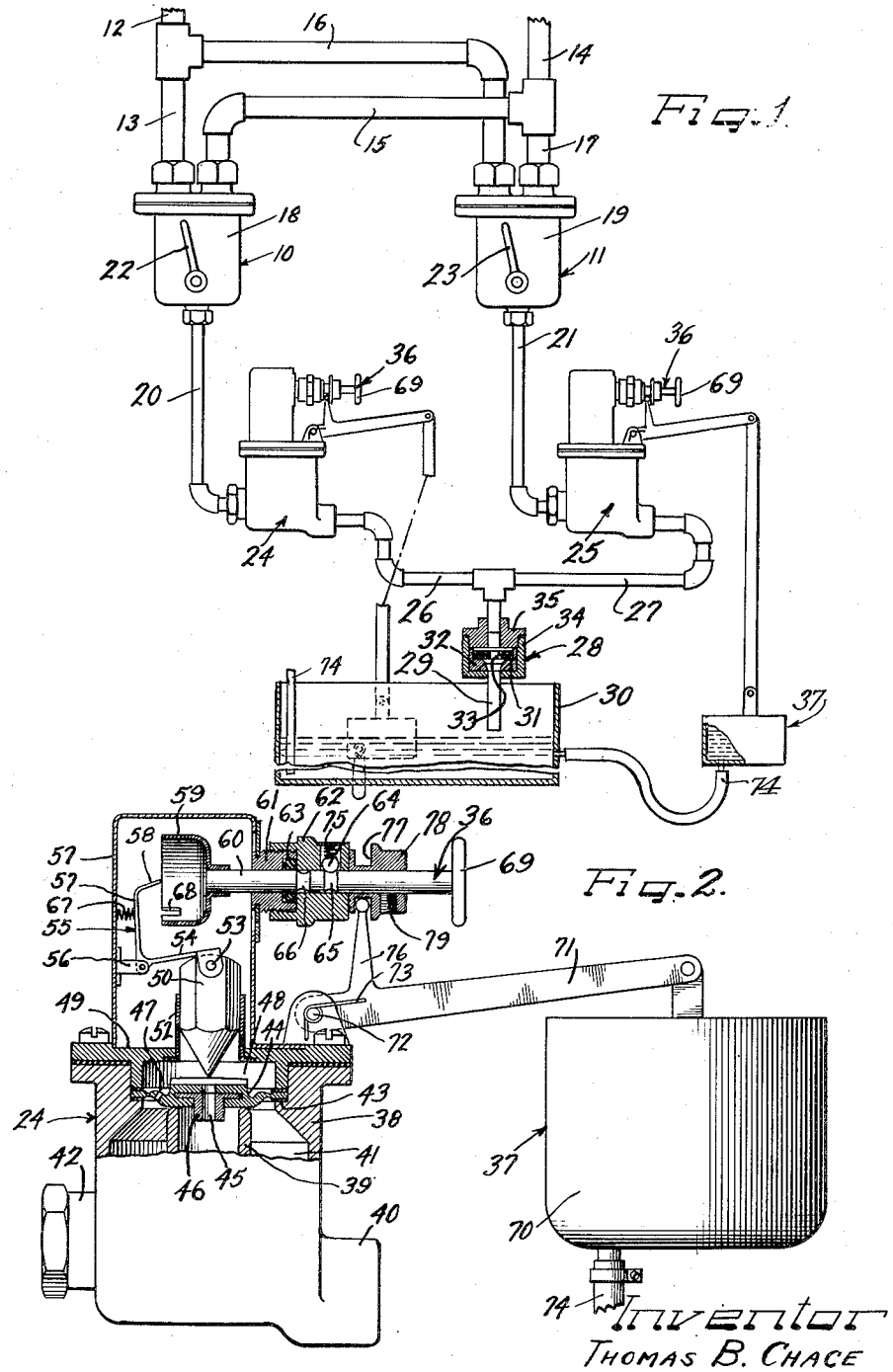
Inventor
THOMAS B. CHACE

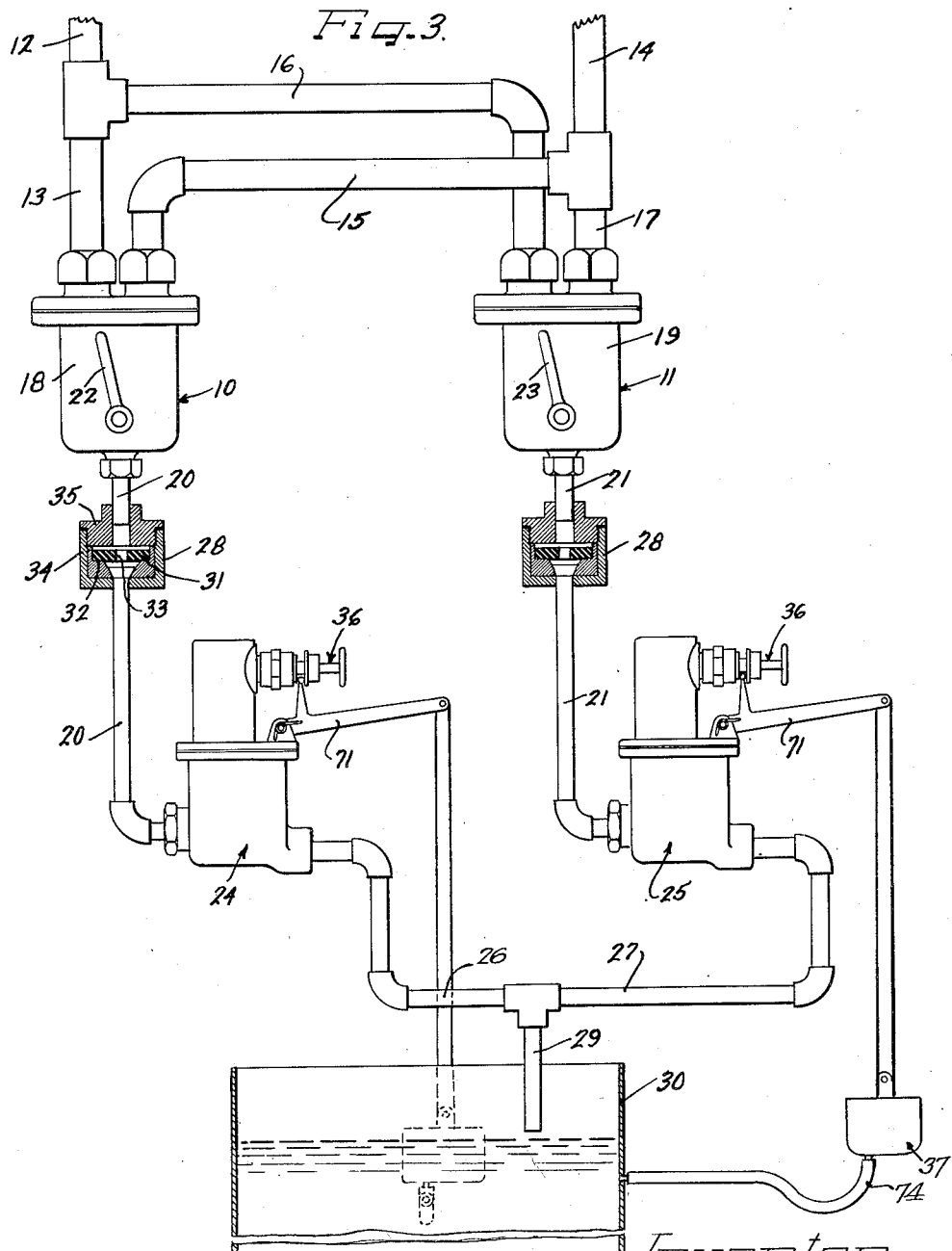

Patented Oct. 31, 1950

2,528,423

UNITED STATES PATENT OFFICE 2,528,423

FLUID MIXING CONTROL SYSTEM

Thomas B. Chace, Winnetka, Ill., assignor to The Dole Valve Company, Chicago, Ill., a corporation of Illinois Application November 13, 1945, Serial No. 627,983

2 Claims. (Cl. 236—12)

1

This invention relates to a fluid control system, and more particularly to a system which is particularly applicable to non-automatic or semi-automatic washing machines.

On non-automatic or semi-automatic domestic washing machines of the type which do not have mechanisms for starting and stopping the machine, filling the tub and emptying the water, and centrifugally drying the clothes, the problem of securing proper temperatured water to the correct level in the tub is a difficult one. The most common practice, at the present time, is to have an inlet hose connected from the faucet to the tub and to adjust the temperature by proportioning the opening of the hot and cold water faucets by hand and waiting until the tub is filled and then closing the faucets.

During the fill period any temperature changes in the supply line, or more particularly, pressure changes creating a pressure differential, will, of course, change the mixed temperature. Of equal importance and considerable inconvenience is the time factor in waiting for the tub to fill, particularly in low pressure areas. The operator usually does not leave the machine during the fill period because of fear of overflowing.

One of the principal features of the present invention is to provide an arrangement which includes an automatic temperature controlled mixer valve with hand opening diaphragm fill valves and a float shut-off for semi-automatic operation.

It is an object of the present invention to provide a novel fluid control system which is semi-automatic in operation.

It is a further object of the present invention to provide a novel fluid control system for a laundry machine.

Another object of the present invention is to provide a novel fluid control system employing a pair of automatic temperature controlled mixer valves which cooperate with a pair of diaphragm shut-off valves and a pair of fluid level responsive members for delivering a predetermined quantity of water to a laundry machine at predetermined desired temperatures.

The novel features which I believe to be characteristic of my invention are set forth with particularity in the appended claims. My invention itself, however, both as to its organization, method of operation and manner of construction, together with further objects and advantages thereof, may best be understood by reference to the accompanying drawings, in which:

Figure 1 is a diagrammatic illustration of a fluid control system embodying the novel teachings of the present invention;

Figure 2 is an enlarged vertical view, partly in section, of one of the diaphragm shut-ff valves, together with its associated fluid level responsive member;

2

Figure 4:
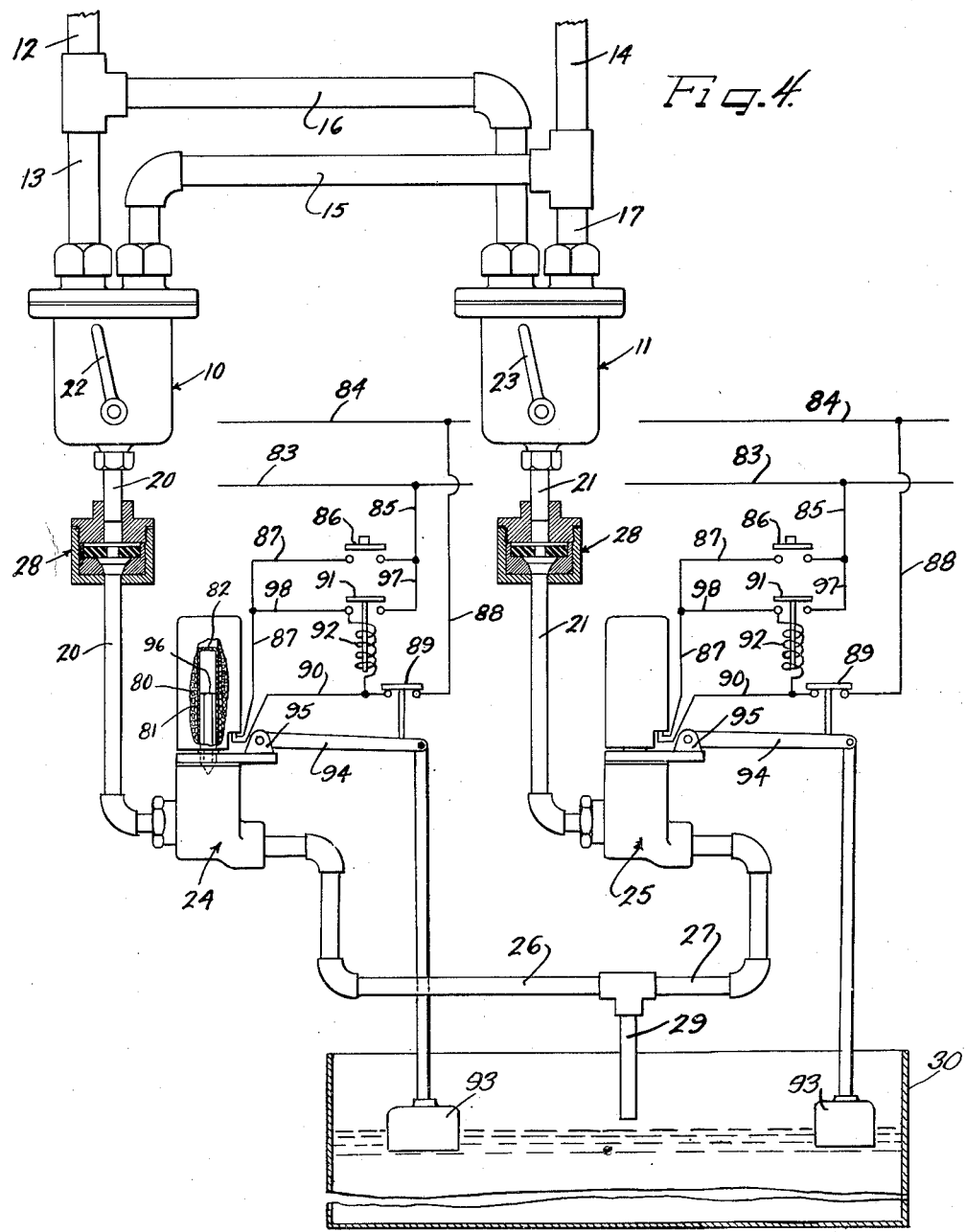

Figure 3 is a diagrammatic illustration of a modified form of the present invention; and Figure 4 is a diagrammatic illustration of a third embodiment of the present invention.

The fluid control system diagrammatically illustrated in Figure 1 of the drawings includes an automatic temperature controlled mixer valve 10 and a second automatic temperature controlled mixer valve 11. These two mixer valves provide a dual mixer valve unit, and while they may be contained within a single housing if desired they have been illustrated as separate units in the diagrammatic illustration in order to emphasize their distinctive functions.

The automatic temperature controlled mixer valve 10 is connected to a hot fluid inlet duct 12 through a pipe 13 and is connected to the cold fluid supply duct 14 through a pipe 15. The automatic temperature controlled mixer valve 11 is connected to the hot fluid supply duct 12 through a pipe 16 and to the cold fluid supply duct 14 through a pipe 17.

The automatic temperature controlled mixer valves 10 and 11 may be of any conventional design having a temperature responsive means therein for automatically proportioning fluid of normally different temperatures to maintain the resulting mixed fluid at a predetermined temperature level. The fluid, such, for example, as water, is mixed within the housings 18 and 19 of the devices 10 and 11 respectively, and is delivered through mixed fluid delivery pipes 20 and 21.

The automatic temperature controlled mixer valves 10 and 11 are preferably provided with temperature adjusting members 22 and 23 respectively for changing the temperature setting of the temperature responsive means contained within the housings 18 and 19 respectively to maintain the mixed fluids at any of a number of different predetermined temperature levels. As will presently be understood, the temperature adjusting member 22 will be set to deliver mixed fluid at a different temperature level from that determined by the temperature adjusting member 23 of the mixer valve 11.

The mixed fluid delivery pipes 20 and 21 are connected respectively to the shutoff valves 24 and 25 and thence through delivery pipes 26 and 27 respectively to an automatic constant rate of flow maintaining device 28. The downstream side of the flow control device 28 is connected to a delivery pipe 29 which opens into the tub or container 30 to which the fluid is to be delivered.

Before taking up the structure of the shutoff valves 24 and 25, it may be stated that the automatic constant rate of flow maintaining device 28 may be of any suitable design but has been illustrated as being of the design described and claimed in the copending application of Leslie A.

Kempton, U. S. Serial No. 545,312, filed July 17, 1944, now Patent No. 2,454,929, dated November 30, 1948, and assigned to the same assignee as the present invention. In substance, this constant rate of flow maintaining device includes a resilient diaphragm member 31 seated on a shoulder member 32 and having a central orifice 33 which is smaller than the opening provided by the shoulder member 32. As the pressure of the fluid against the upper side of the resilient member 31 increases, the washer or resilient member 31 is deflected downwardly, causing a smaller and smaller restriction in the upper end of the orifice 33. It has been found in practice that a construction of the type diagrammatically illustrated herein will maintain a substantially constant rate of fluid flow in the outlet irrespective of very wide variations in fluid pressure (such, for example, as variations of 15 pounds per square inch to 150 pounds per square inch).

The seat member having the shoulder member 32 on the resilient washer or diaphragm member 31 may be housed in any suitable container, and for diagrammatic purposes has been illustrated merely as a simple housing 34 having a removable cover plate 35 in the upper portion thereof.

The shutoff valves 24 and 25 are both alike and only one will be described in detail. More specifically, one of the two shutoff valves 24 and 25 is illustrated in Figure 2 of the drawings, namely, the shutoff valve 24.

The shutoff valve 24 includes manually operable mechanism 36 for opening the valve and fluid level responsive member or fluid weight operated mechanism 37 for shutting off the valve to interrupt the flow of fluid from the pipe 20 to the delivery pipes 26 and 29. As shown in Figure 2 of the drawings, the shutoff valve 24 is of the pilot-operated diaphragm type and includes a casing or housing 38 in which is disposed a central sleeve or post 39. The sleeve or post 39 communicates directly with the outlet 40 of the casing 38, while the chamber 41 surrounding the post 39 communicates directly with the inlet 42 of the casing 38. A shoulder 43 is provided on the inner wall of the casing 38 opposite the upper end of the hollow central post 39. Upon this shoulder 43 is seated a resilient diaphragm 44 which closes the upper end of the chamber 41 and is also disposed to be seated on the upper end of the central post 39.

The diaphragm 44 has a central aperture or orifice 45 therein which is reinforced by an eyelet or collar 46. The diaphragm is also provided with one or more small openings 47 which are located radially outwardly of the central post 39 and arranged to communicate the chamber 41 with the chamber 48 and the upper side of the diaphragm 44. This chamber 48 is formed by the cooperation of a top plate 49 with the main housing member 38.

The size of the opening 47, or, in the case of more than one opening, the total combined area of the openings 47, is less than the cross-sectional area of the opening 45. When the orifice 45 is open the fluid which has previously entered the upper chamber 48 through the opening 47 will escape more rapidly through opening 45 than it can through opening 47. This creates a greater pressure on the under side of the diaphragm 44 than on the upper side. The fluid itself thus actuates the diaphragm to lift it off of the central post 39 and fluid thereafter flows freely from the inlet 42 to the outlet 40. This will continue until the opening 45 is closed. At that time fluid from the inlet 42 under pressure will gradually work through the opening or openings 47 into the upper chamber 48. Since the fluid acting over the entire upper surface of the diaphragm 44 acts over a greater area than the fluid acting against the annular portion between the center post 39 and the side wall of the casing 38 where the diaphragm 44 is gripped, the diaphragm will be moved by the fluid pressure itself down against the center post 39. This shuts off the flow of fluid from the inlet 42 to the outlet 40.

The means by which the opening 45 in the diaphragm 44 is closed will now be described. A pilot 50 having a tapered lower end 51 is slidably mounted in an upstanding sleeve member 52. The tapered end 51 is arranged to engage the diaphragm 44 to close the opening 45 when in its lower position. A mechanism is also provided to raise the pilot 50 so as to free the tapered end 51 from the upper end of the opening 45. To this end, the pilot 50 is hinged as at 53 to the outer end of the lower arm 54 of an L-shaped member 55. The L-shaped member 55 is pivotally mounted on a bracket 56 carried on an upper housing member 57 which makes a fluid-tight connection with the top plate 49 of the housing member 38. The L-shaped member 55 also includes an upper arm portion 57 having an inwardly bent tongue 58 which bears against a cup-shaped cam member 59 mounted on a shaft 60. The shaft 60 is supported in a bearing member 61 carried on the housing 57 and also extends through a sleeve 62 carried on the bearing 61. An "O-ring" seal 63 is carried by the bearing member 61 around the shaft 60 to prevent leakage of fluid from within the shell 57 along the shaft 60.

The sleeve 62 contains a spring-pressed ball member 64 which is arranged to normally hold the shaft 60 in one of two positions. The two positions are determined by annular grooves 65 and 66 formed in the shaft 60. The location of the grooves 65 and 66 is such that when the groove 65 is in engagement with the ball member 64 the cup-shaped member 59 is in the position as shown in Figure 2 of the drawings. This means that the cup-shaped member 59 has engaged the tongue portion 58 to raise the pilot 50 and open the central opening 45 in the diaphragm 44.

As shown in Figure 2 of the drawings, the various parts are in their positions at just an instant after the pilot 50 has been raised, but prior to the time when the fluid in the upper chamber 48 has been bled through the central opening 45. This dumping of the fluid, however, in the upper chamber 48 takes place in a very short interval of time so that the action of the fluid in the inlet chamber 41 against the diaphragm 44 to raise the same is almost instantaneous.

When the shaft 60 is in its retracted position so that the groove 66 is in engagement with the ball 64 the cup-shaped member 59 has been moved out of engagement with the tongue portion 58, thus enabling the biasing spring 67 to return the pilot 50 to engagement with the diaphragm 44 and close the opening 45.

The cup 59 is also provided with a cutout 68 which enables closure of the pilot 50 by rotation of the shaft 60 rather than by axial movement of the same. More particularly, the shaft 60 may be left in its axial position, as shown in Figure 2 of the drawings, with the groove 65 in engagement with the ball 64. The pilot 50 may then be closed by simply rotating the shaft 60 until the follower 58 falls into the notch 68. The handle or knob 69 is provided on the end of the shaft 60 for either rotating the shaft or moving the same axially.

The particular fluid control means or fluid level responsive member illustrated in Figures 1 and 2 of the drawings, is a fluid level responsive member of the so-called weight operated type.

In the weight-operated type of fluid level responsive member, as illustrated in Figures 1 and 2 of the drawings, the fluid level responsive means is in the form of a cup member 70 which is pivotally supported on an arm 71 hinged as at 72 and normally biased to its upper position by a spring 73. A hose connection 74 communicates with the cup member 70 and the tub 30. Thus when the fluid in the tub has risen to a height sufficient to cause water to flow into the cup 70, the weight of the water in the cup 70 causes the arm 71 to drop down from its position as shown in Figure 2 to a position where the groove 66 is in engagement with the ball 64.

Thus when the cup 70 has been filled with water the pilot 50 closes the opening 45 of the diaphragm 44 and causes the shutoff valve 24 to be closed.

The biasing spring 75 which presses the ball 64 into engagement with the shaft 60 is of sufficient strength to prevent movement of the shaft 60 as long as the cup-shaped member 70 is empty. When the cup-shaped member 70 fills with water the weight overcomes the retaining action of the biasing spring 75 to cause movement of the shaft 60 to the right, as viewed in the drawings. This is effected by a finger portion 76 formed on the arm 71 which extends up into a deep recess 77 formed in a collar member 78 which is fixed on the shaft 60 by a set-screw 79.

The above described system provides a complete unitary system for delivering water at a plurality of different selected temperatures to the tub 30. More particularly, it provides a simple and convenient way in which any one of several selected temperatures may be chosen for the washing machine by manually opening the appropriate valve or valves and the supply of fluid to the tub will automatically shut off all of the supply pipes when the tub has been filled with water, as indicated by the fluid level responsive member. For example, assume that the automatic temperature controlled mixer valve 10 is set for 170° and that the automatic temperature controlled mixer valve 11 is set for 130°. If now shutoff valve 24 is open while shutoff valve 25 remains closed, water is delivered to the tub 30 at 170° temperature, and this water supply will be shut off when the desired water level has been reached in the tub 30 as determined by the fluid level responsive member 37, it being understood that the fluid level responsive member 37 is disposed at a height dependent upon the height at which water is desired in the tub 30.

Suppose the water in the tub 30 is to be water at 150° temperature. Under such circumstances both shutoff valve 24 and shutoff valve 25 are opened by manually pushing in on both knobs 69 and with each cup-shaped member 59 so positioned that the notch 68 does not lie opposite the tongue 58. This causes each of the pilots 50 to open, thereby effecting opening of each of the shutoff valves 24 and 25. The water now delivered to the tub 30 will be water having a temperature of 150°.

If the water to be used in the tub 30 is to be water relatively cooler, the valve 25 is opened by pushing in the control handle 69 of that valve thereby opening the valve 25, while at the same time leaving the valve 24 closed.

In Figure 3 of the drawings a modified form of the present invention is shown wherein two automatic flow control devices 28 are employed between the mixer valves and the shutoff valves rather than using a single automatic flow control device in the final delivery pipe. As shown in Figure 3 of the drawings, the automatic rate of flow maintaining devices 28 are disposed one in the pipe line 20 between the mixer valve 10 and the shutoff valve 24 and the other in the pipe line 21 between the mixer valve 11 and the shutoff valve 25.

The use of two automatic rate of flow maintaining devices, as indicated in Figure 3 of the drawings, gives a little closer regulation in that it maintains a constant rate of flow through the pipe lines 20 and 21. The intermediate water temperature obtained by opening both shutoff valves 24 and 25 is therefore very accurately maintained since variations in pressure between the hot and cold inlets will not cause any variation in the water being mixed in the pipe 29 from the delivery pipes 26 and 27. In all other respects the form of the invention shown in Figure 3 is the same as that described in connection with Figure 1.

An electrical version of the invention is illustrated in Figure 4 of the drawings, wherein pushbutton operation effects opening of the respective shutoff valves while a fluid level responsive mechanism effects closing of the shutoff valves. The form of the fluid circuit, including the two automatic temperature controlled mixer valves 10 and 11, the automatic rate of flow maintaining devices 28, the fluid shutoff valves 24 and 25, the final delivery pipe 29 over the tub 30, is the same as that illustrated in connection with Figure 3 of the drawings. This embodiment of the invention differs in the mechanism for operating the two shutoff valves 24 and 25.

More particularly, the shutoff valve 24, which is of the pilot operated diaphragm type, includes a solenoid 80 which surrounds a sleeve 81 of brass or the like. The sleeve 81 is closed as at 82 at its upper end so as to prevent fluid from passing out into the winding 80 forming the solenoid. The sleeve 81 thus takes the sleeve 52 shown in Figure 2 of the drawings. Since the mechanism below the solenoid 80 and the sleeve 81 is the same as that shown in Figure 2 of the drawings, it will not be repeated in connection with Figure 4.

The solenoid 80 is arranged to be energized from power supply conductors 83 and 84. The power supply conductor 83 is connected through a conductor 85, a pushbutton switch 86 and conductor 87 to one side of the solenoid 80. The other side of the solenoid 80 is connected through the power supply line 84 to conductor 88 and float operated switch 89 and conductor 90. A relay holding circuit is also provided by connecting relay operated switch 91 in shunt with the pushbutton switch 86 and by connecting the operating coil 92 of the relay between conductor 87 and conductor 90. That is to say, the relay 92 is in parallel with the solenoid 80.

A fluid level responsive member 93 of the buoyant type is suspended from a pivotally mounted arm 94 mounted on the bracket or ear 95 carried on the casing of the shutoff valve 25. The pivotally mounted arm 94 also carries the bridging contact 89. As shown in Figure 4 of the drawings, the fluid level responsive member 93 is in its position where it is not in engagement with the fluid being delivered to the tank 30. It will further be understood that the fluid level responsive member 93 will be located in such a position as to be raised when the fluid delivered to the tub 30 has reached a predetermined desired height. When the fluid level responsive member 93 is raised the bridging contact 89 opens the circuit between conductors 88 and 90.

Considering now the operation of the circuit above described, let it be assumed that there is no water in the tub 30 and that it is desired to deliver water thereto from the automatic temperature controlled mixer valve 10 through the shutoff valve 24. Pushbutton switch 86 is depressed, thereby effecting energization of the solenoid 80. This energization circuit is from the power supply conductor 83 through conductor 85, pushbutton switch 86, conductor 87, solenoid 80, conductor 90, float switch 89 (which is normally closed) and conductor 88, back to the other power supply conductor 84. This energization of the solenoid 80 attracts the pilot 96 which is formed of soft iron or other magnetizable material having low magnetic retentivity. When the pilot valve 96 is raised the diaphragm 44 is raised due to the uncovering of the central opening 45 (see Fig. 2). Simultaneously with the closing of the pushbutton 86 the relay 92 is energized due to the fact that it is in parallel with the solenoid 80. Energization of the relay 92 causes its own bridging contact 91 to close thereby effecting energization of the relay through its own contact. In this position the relay is energized from the power supply conductor 83, conductor 85, conductor 97, relay contact 91, relay 92, float switch 89 and conductor 88 back to the other power supply conductor 84. Thus even though the pushbutton switch 86 is promptly released the solenoid 80 remains energized through the parallel connection of the relay 91 with the pushbutton switch 86. More specifically the solenoid 80 is now energized from power supply conductor 83 through conductors 85 and 97, relay contact 91, conductors 98 and 87 on the one side and through conductors 88 and 90 and the float switch 89 on the other side. This circuit remains closed until the water reaches a sufficient height in the tub 30 to raise the fluid level responsive member 93. This breaks the circuit at the fluid level responsive member switch 89 and causes deenergization of the relay coil 92 as well as deenergization of the solenoid 80. By deenergization of the coil 80 the pilot 96 drops down to close the central opening 45 (see Fig. 2) in the diaphragm 44 of the shutoff valve 24 thereby promptly effecting a closure of the shutoff valve 24.

Shutoff valve 25 is operated and arranged in the same manner as that just described in connection with the shutoff valve 24 and similar reference characters have been applied.

The operation of the fluid circuit to effect delivery of the water or other fluid to the tub 30 in any one of three desired temperatures, and to effect automatic shutoff of this supply by fluid level responsive member operated switches is similar to that described in connection with Figure 3 of the drawings.

While I have shown particular embodiments of my invention, it will, of course, be understood that I do not wish to be limited thereto, since many modifications may be made, and I, therefore, contemplate by the appended claims to cover all such modifications as fall within the true spirit and scope of my invention.

I claim as my invention:

1. A washing machine fluid control system comprising relatively hot and cold fluid supply conduits, a pair of automatic temperature control mixing valves, each connected to said hot and cold fluid supply conduits and each having a delivery conduit to deliver a mixture of hot and cold fluids at a predetermined temperature, the delivery temperature from one valve being different from the temperature from the other valve, a common delivery duct to which said delivery conduits are both connected, a pair of valves for opening and shutting off the supply of fluid passing through said delivery conduits, means under manual control for opening said supply valves, a pair of fluid level responsive means, one associated with each supply valve and adapted to shift said first means, for closing each supply valve, and means in said fluid control circuit for automatically maintaining a constant rate of fluid flow from said delivery ducts.

2. A washing machine fluid control system comprising relatively hot and cold fluid supply conduits, a pair of automatic temperature control mixing valves, each connected to said hot and cold fluid supply conduits and each having a delivery conduit to deliver a mixture of hot and cold fluids at a predetermined temperature, the delivery temperature from one valve being different from the temperature from the other valve, a common delivery duct to which said delivery conduits are both connected, a pair of valves for opening and shutting off the supply of fluid passing through said delivery conduits, means under manual control for opening said supply valves, a pair of fluid level responsive means, one associated with each supply valve, and adapted to shift said first means to close each supply valve, and means in each of said delivery conduits for automatically maintaining a constant rate of fluid flow therethrough whereby the temperature of the fluid delivered from said delivery ducts is maintained constant, and whereby the rate of flow of fluid from said delivery ducts is also maintained constant.

THOMAS B. CHACE.

REFERENCES CITED

The following references are of record in the file of this patent:

UNITED STATES PATENTS

| Number | Name | Date |
| --- | --- | --- |
| 775,021 | Waterman | Nov. 15, 1904 |
| 1,960,519 | Warner | May 29, 1934 |
| 2,062,095 | Kniskern | Nov. 24, 1936 |
| 2,110,952 | Glenn | Mar. 15, 1938 |
| 2,146,930 | Bassett | Feb. 14, 1939 |
| 2,188,366 | Linstaedt | Jan. 30, 1940 |
| 2,296,266 | Breckenridge | Sept. 22, 1942 |
| 2,321,573 | Chace | June 15, 1943 |
| 2,389,134 | Brown | Nov. 20, 1945 |
| 2,425,788 | Edwards | Aug. 19, 1947 |

FOREIGN PATENTS

| Number | Country | Date |
| --- | --- | --- |
| 824,881 | France | Nov. 18, 1937 |